United States Patent [19]

Murata

[11] Patent Number: 5,654,593
[45] Date of Patent: Aug. 5, 1997

[54] EXTERNAL POWER SOURCE ON/OFF CONTROL SYSTEM

[75] Inventor: Koichi Murata, Kawasaki, Japan

[73] Assignee: Fujitsu Limited, Kawasaki, Japan

[21] Appl. No.: 517,208

[22] Filed: Aug. 21, 1995

[30] Foreign Application Priority Data

Dec. 12, 1994 [JP] Japan .................. 6-307753

[51] Int. Cl.⁶ .................................................. H02J 3/14
[52] U.S. Cl. ........................ 307/86; 307/85; 364/273;
364/273.1; 364/273.2; 364/273.3; 364/273.4;
364/273.5; 364/492; 395/750.02
[58] Field of Search ............................ 307/86, 85, 43,
307/147, 64, 66; 364/492, 273–273.5, 707;
395/750; 200/50.28

[56] References Cited

U.S. PATENT DOCUMENTS

| | | | |
|---|---|---|---|
| 4,812,672 | 3/1989 | Cowan et al. | 307/64 |
| 4,970,623 | 11/1990 | Pintar | 361/187 |
| 5,055,962 | 10/1991 | Peterson et al. | 361/187 |
| 5,144,395 | 9/1992 | Miyajima et al. | 357/30 |
| 5,164,609 | 11/1992 | Poppe et al. | 307/147 |
| 5,384,491 | 1/1995 | Suizu | 307/113 |
| 5,406,128 | 4/1995 | Arinobu | 307/64 |

FOREIGN PATENT DOCUMENTS

| | | |
|---|---|---|
| 467778 | 2/1992 | European Pat. Off. . |
| 472261 | 2/1992 | European Pat. Off. . |
| 481466 | 4/1992 | European Pat. Off. . |
| 547862 | 6/1993 | European Pat. Off. . |
| 2131238 | 6/1984 | United Kingdom . |
| 2255865 | 11/1992 | United Kingdom . |

Primary Examiner—William M. Shoop, Jr.
Assistant Examiner—Albert W. Paladini
Attorney, Agent, or Firm—Armstrong, Westerman, Hattori, McLeland & Naughton

[57] ABSTRACT

An interface cable used for electrically connecting a terminal apparatus to a host apparatus. The host apparatus has an internal power source and a switch for turning on/off the internal power source. A cable means is used for electrically connecting an external power source to the terminal apparatus to supply electrical power from the external power source to the terminal apparatus. The external power source on/off control system includes a switch, such as an electromagnetic relay, incorporated in a module connected to the cable, for detecting the on/off state of the internal power source in the host apparatus and turning on or off the external power source on the basis of the on/off state of the internal power source.

15 Claims, 5 Drawing Sheets

EXTERNAL POWER SOURCE ON/OFF CONTROL SYSTEM

BACKGROUND OF THE INVENTION

1. Field of the Invention

This invention relates to an external power source on/off control system, and more particularly, to an external power source on/off control system which is incorporated in an interface cable for electrically connecting a host apparatus to a terminal apparatus.

2. Description of the Related Art

In an interface cable for electrically connecting a host apparatus to a terminal apparatus, such as a bar-code reader, a printer, a display, a keyboard or the like, an interface cable including therein power supply lines as well as signal lines is known. Such an interface cable is conventionally used in the terminal side of the POS (Point of Sale) system. Of course, an interface cable including power supply lines as well as signal lines is used for supplying electric power from an internal power source in the host apparatus to the terminal apparatus, as well as for signal or data communication between the host and the terminal apparatus.

Regarding such POS systems, it is expected that the number of the terminal apparatuses will be increased with respect to a single host apparatus. Thus, a large number of input/output connectors for the interface cables must be prepared. However, since the capacity of the internal power source of the host apparatus is limited, the necessary power for all of the terminal apparatuses will be larger than the capacity of the internal power source. In this case, an external power source, such as an AC adaptor, must be used to supply electrical power to the respective terminal apparatus.

Therefore, the terminal apparatus is conventionally provided with connectors for an external power supply, to which a connector extending from the external power source can detachably be connected. Of course, the terminal apparatus is connected to the host apparatus by means of an interface cable, by which the communication of control signals and data between the host and terminal apparatuses can be conducted. In this case, however, the power supply line in the interface cable should be disconnected from the power supply line of the host apparatus.

As mentioned above, if the external power sources are appropriately used, it becomes possible to increase the number of terminal apparatuses in spite of the limited capacity of the internal power source of the host apparatus. However, in the terminal apparatus using an external power source, when the internal power source of the host apparatus is turned off, the external power source of the terminal apparatus is not automatically turned off, but usually continues to be turned on. Thus, in this case, the switch of the external power source of the terminal apparatus should usually be manually turned off by the operator, but sometimes this is forgotten. If the number of terminal apparatuses is increased, the probability that the operator may forget to turn off the power switches of the terminal apparatuses will also increase.

SUMMARY OF THE INVENTION

An object of the present invention is to provide an external power source on/off control system which is incorporated in an interface cable for electrically connecting a host apparatus to a terminal apparatus, in which the on/off control of the external power source can be automatically conducted in accordance with the on/off state of the internal power source in the host apparatus.

According to the present invention, there is provided an apparatus for an external power source on/off control system comprising: a host apparatus having an internal power source and first switch means for turning on/off said internal power source; at least one terminal apparatus; an interface cable for electrically connecting said terminal apparatus to said host apparatus; an external power source; cable means for electrically connecting said external power source to said terminal apparatus to supply electric power from said external power source to said terminal apparatus; and second switch means, incorporated in a module in said cable means, for detecting on/off state of said internal power source to turn on/off said external power source on the basis of the on/off state of said internal power source.

Thus, according to the present invention, when the internal power source of the host apparatus is turned on, the external power source for a terminal apparatus is automatically turned on and, on the other hand, when the internal power source of the host apparatus is turned off, the external power source for a terminal apparatus is automatically turned off.

DESCRIPTION OF THE PREFERRED EMBODIMENTS

Figure 1:
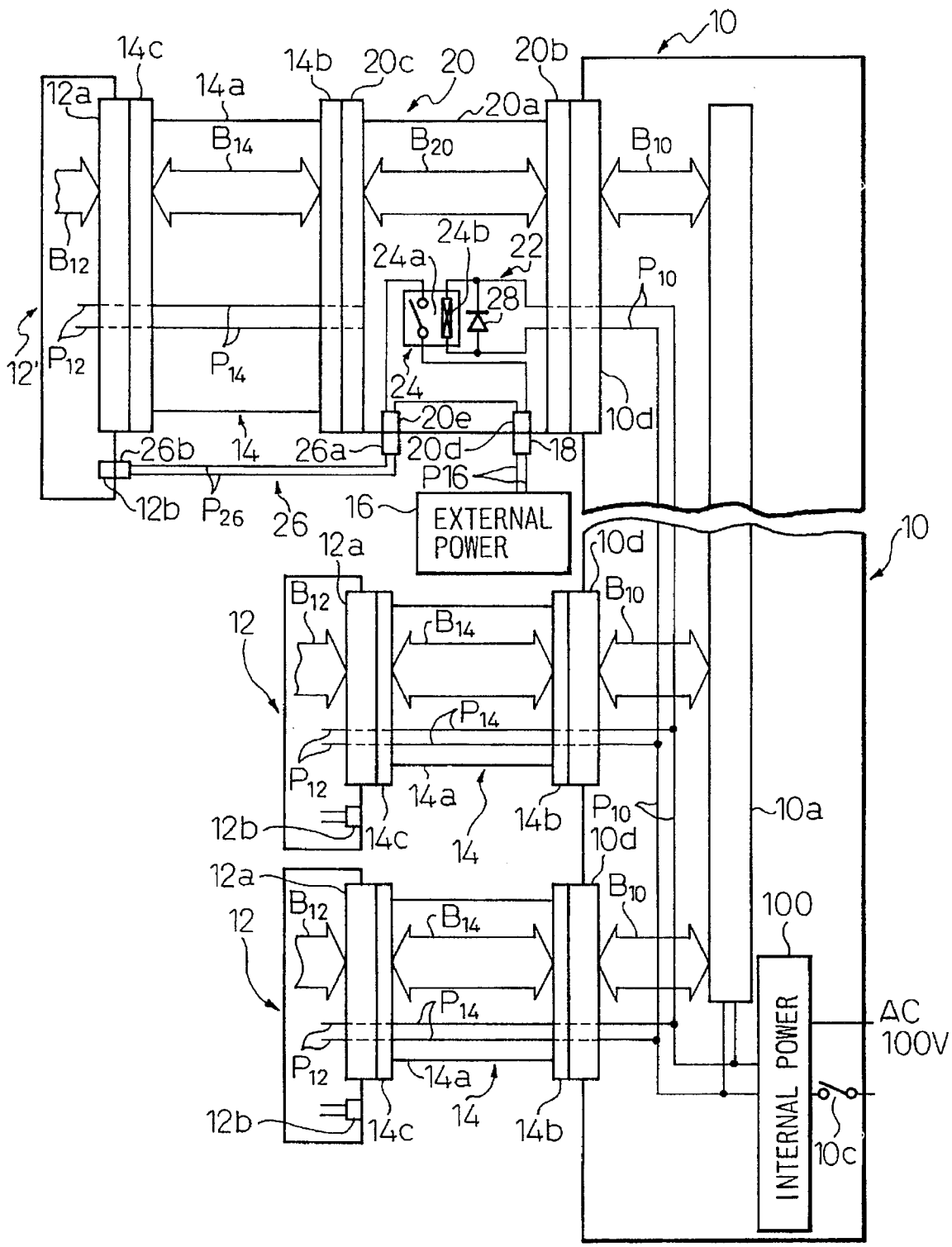
FIG. 1 is a block diagram of host and terminal apparatuses and an external power source on/off control system according to this invention.

In FIG. 1, a POS (Point of Sale) system is provided with a host apparatus 10 and a plurality of terminal apparatuses 12 (or 12') near the host apparatus 10. The terminal apparatuses 12, such as bar-code readers, printers, displays, keyboards or the like, are mutually connected to the host apparatus 10 by means of interface cables 14. The host apparatus 10 is provided with a controller 10a, including a control circuit board, which controls the operation of the terminal apparatuses 12 (or 12'), processes the data obtained therefrom and conducts data communication with a central processing station. Electrical power is supplied by the controller 10a from a power supply circuit 10b which is connected to the commercial power source (AC 100 V) by means of a power switch 10c.

The interface cable 14 includes a cable body 14a, and connectors 14b and 14c attached to the respective ends of the cable body 14a. The cable body 14a includes therein not only a plurality of signal lines, indicated as bus $B_{14}$, but also power supply lines $P_{14}$. One connector 14b is detachably connected to a connector 10d of the host apparatus 10 and the other connector 14c is detachably connected to a connector 12a of the terminal apparatus 14.

When the terminal apparatus 12 is electrically connected to the host apparatus 10 by means of the interface cable 14, the bus $B_{10}$ of the host apparatus 10 is connected to the bus $B_{14}$ of the cable body 14a by means of the connectors 10d and 14b and also the power supply lines $P_{10}$ of the host apparatus 10 are also connected to the power supply lines $P_{14}$ of the cable body 14a by means of the connectors 10d and 14b. On the other hand, the bus $B_{12}$ of the terminal apparatus 12 is connected to the bus $B_{14}$ of the cable body 14a by means of the connectors 12a and 14c and the power supply lines $P_{12}$ of the terminal apparatus 12 are also connected to the power supply lines $P_{14}$ of the cable body 14a by means of the connectors 12a and 14c. Thus, the interface cable 14 is not only served for communication of control signals or data between the host apparatus 10 and the terminal apparatus 12; but also served for power supply from the internal power source in the host apparatus 10 to the terminal apparatus 12.

The terminal apparatus 12 is provided with connectors 12b for external power supply, to which a connector (not shown) extending from the external power source can be detachably connected.

Referring now to the embodiment shown in FIGS. 1 and 2, an external power source on/off control system according to this invention will now be described in detail. FIG. 1 (the top portion thereof) shows an embodiment of the external power source on/off control system.

In this embodiment, a unit 20 includes an external power source on/off control system of this invention. The unit 20 is detachably disposed between the connector 10d of the host apparatus 10 and the connector 14d of the interface cable 14. Namely, the unit 20 comprises a unit body 20a and connectors 20b and 20c which are arranged at the respective sides of the unit body 20a and connected to the connectors 10d and 14b, respectively. The unit body 20a includes therein a plurality of signal lines, as shown at bus $B_{20}$, the respective ends thereof being in contact with the corresponding contact in the connectors 20b and 20c.

The unit body 20a also includes therein a detecting circuit 22 for detecting the on/off state of the internal power source 10b in the host apparatus 10. The detecting circuit 22 is connected to the power supply line $P_{10}$ of the host apparatus 10 by the connection between the connectors 20b and 10d. In this embodiment, the detecting circuit 22 includes therein a small electromagnetic relay 24 comprising a switch 24a and a coil 24b for electromagnetically actuating the switch 24a. The detecting circuit 22 is arranged in such a manner that the voltage of the power supply lines $P_{10}$ is applied to the coil 24b of the relay 24. Namely, when the power switch 10c of the host apparatus 10 is turned on, the voltage of the internal power source 10b is applied through the power supply lines $P_{10}$ and the detecting circuit 22 to the coil 24b.

The unit body 20a is also provided with connectors 20d and 20e which are connected to one other via the electromagnetic relay 24. Particularly, one of the power supply lines extending from the connector 20d is connected to one of the contacts of the switch 24a of the relay 24. One of the power supply lines extending from the connector 20e is connected to the other contact of the switch 24a of the relay 24. Also, the other power supply line extending from the connector 20d and the other power supply line extending from the connector 20e are connected to each other. The connector 20d is connected to the connector 18 attached to the power supply line $P_{16}$ extending from the external power source 16 and, on the other hand, the connector 20e is connected to the connector 12b of the terminal apparatus 12' by means of the power supply cord 26. The power supply cord 26 comprises a power supply line $P_{26}$ and connectors 26a and 26b attached to the respective ends of this power supply line $P_{26}$. The connector 26a is connected to the connector 20e of the unit 20 and the connector 26b is connected to the connector 12b of the terminal apparatus 12'. Consequently, the external power source 16 is connected to the terminal apparatus 12' by means of the switch 24a of the electromagnetic relay 24, which therefore functions as a power switch for the external power source 16.

The operation of the unit 20 containing therein an on/off control system of the present invention will now be described.

When the power switch 10c of the host apparatus 10 is turned on, a voltage is applied to the coil 24b of the electromagnetic relay 24. Therefore, the switch 24a of the electromagnetic relay 24 is turned on by the magnetic force of the coil 24b so that a power supply from the external power source 16 to the terminal apparatus 12' is started.

On the other hand, when the power switch 10c of the host apparatus 10 is turned off, the electromagnetic force of the coil 24b of the electromagnetic relay 24 is eliminated, so that the switch 24a is turned off and the power supply from the external power source 16 to the terminal apparatus 12' is stopped. Thus, the on/off state of power supply for the terminal apparatus 12' using the external power source 16 can also be controlled, in the same manner as the terminal apparatus 12 which uses the internal power source 10b of the host apparatus 10.

In FIG. 1, reference numeral 28 (in the detecting circuit 22) denotes a diode for discharging a negative electromotive force generated in the coil 24b when the power switch 10c is turned off.

Figure 2:
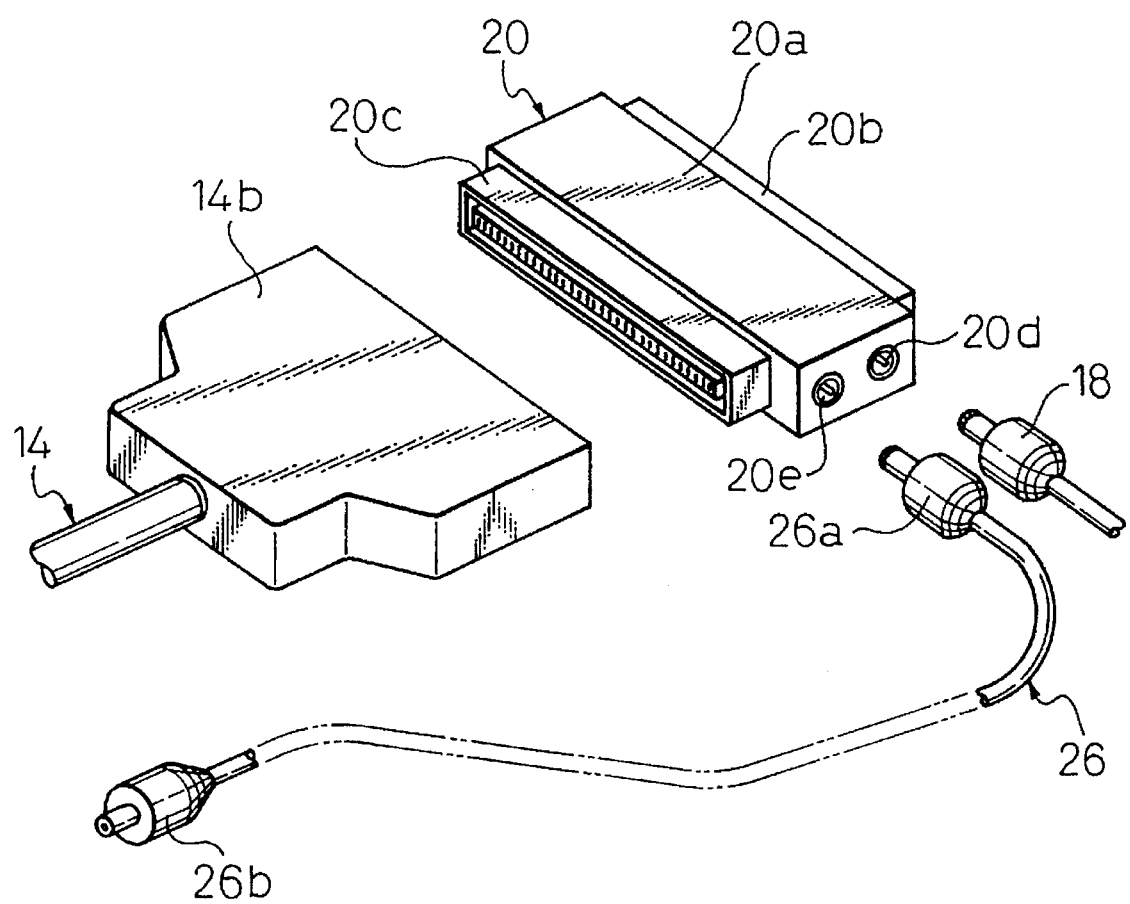
FIG. 2 is a perspective view showing a part of an interface cable and a unit incorporating therein an external power source on/off control system as shown in FIG. 1.

In the embodiment shown in FIGS. 1 and 2, although the unit 20 is disposed between the connector 10d of the host apparatus 10 and the connector 14b of the interface cable 14, it is also possible to dispose the unit 20 between the connector 12a of the terminal apparatus 12' and the connector 14c of the interface cable 14. In addition, any other type of relay, such as a photo-mos relay or the like can also be used in place of the electromagnetic relay 24, as shown in FIG. 1.

Figure 3:
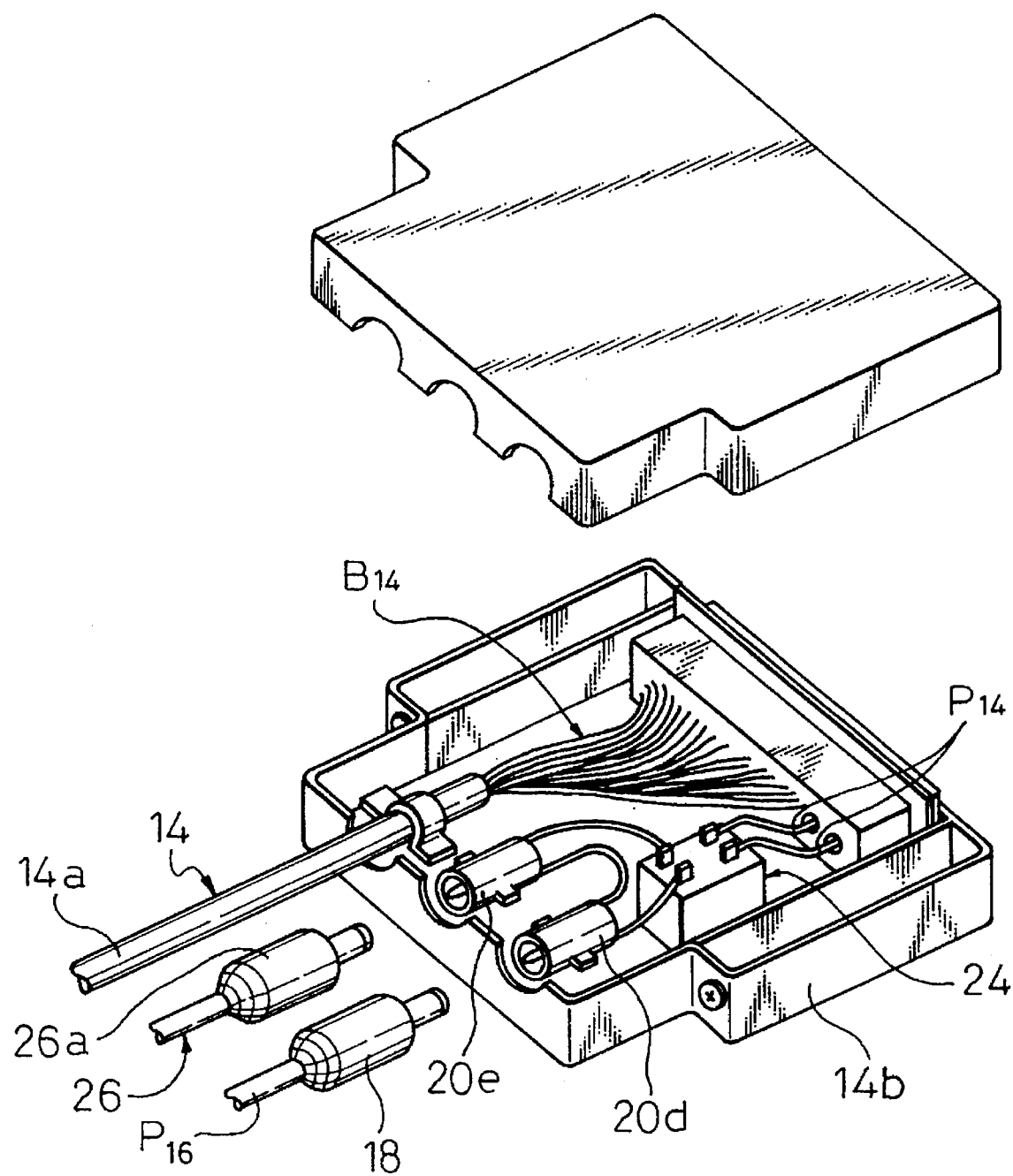
FIG. 3 is a perspective view showing another embodiment of an external power source on/off control system of this invention which is incorporated in one of the connectors, i.e., a host apparatus side connector, of the interface cable.

FIG. 3 shows another embodiment of an external power source on/off control system, of this invention, which is incorporated in one of the connectors of the interface cable 14. The on/off control system in this embodiment is substantially the same as that of FIGS. 1 and 2. Therefore, the parts in FIG. 3 are indicated by the same or corresponding reference numerals as in the block diagram in FIG. 1.

In this embodiment, the connector 14b is provided therein with the connectors 20d and 20e which are connected to each other by means of a switch (24a) of an electromagnetic relay 24, in the same manner as in FIG. 1. The connector 14b is also provided therein with the electromagnetic relay 24 as shown in FIG. 1, the coil (24b) having the respective contacts connected to power supply lines $P_{14}$ extending from the corresponding contacts of the connector 14b.

In this embodiment, the cable body 14a of the interface cable 14 includes therein no power supply lines, but includes only the bus ($B_{14}$). When such an interface cable 14 is used for connecting the terminal apparatus 12' to the host apparatus 10, the power supply lines $P_{14}$ and $P_{10}$ are mutually connected by the connection between the connectors 14b and 10d. On the other hand, the connector 20d is connected to the connector 18 of the power supply line $P_{16}$ extending from the external power source (16) and the connector 20e is connected to the connector 12b of the terminal apparatus 12' by means of the power supply cord 26. In the same manner as the embodiment shown in FIGS. 1 and 2, when the power switch 10c (FIG. 1) of the host apparatus 10 is turned on, a power supply from the external power source 16 to the terminal apparatus 12' is started and, on the other hand, when the power switch 10c of the host apparatus 10 is turned off, the power supply from the external power source 16 to the terminal apparatus 12' is stopped.

Figure 4:
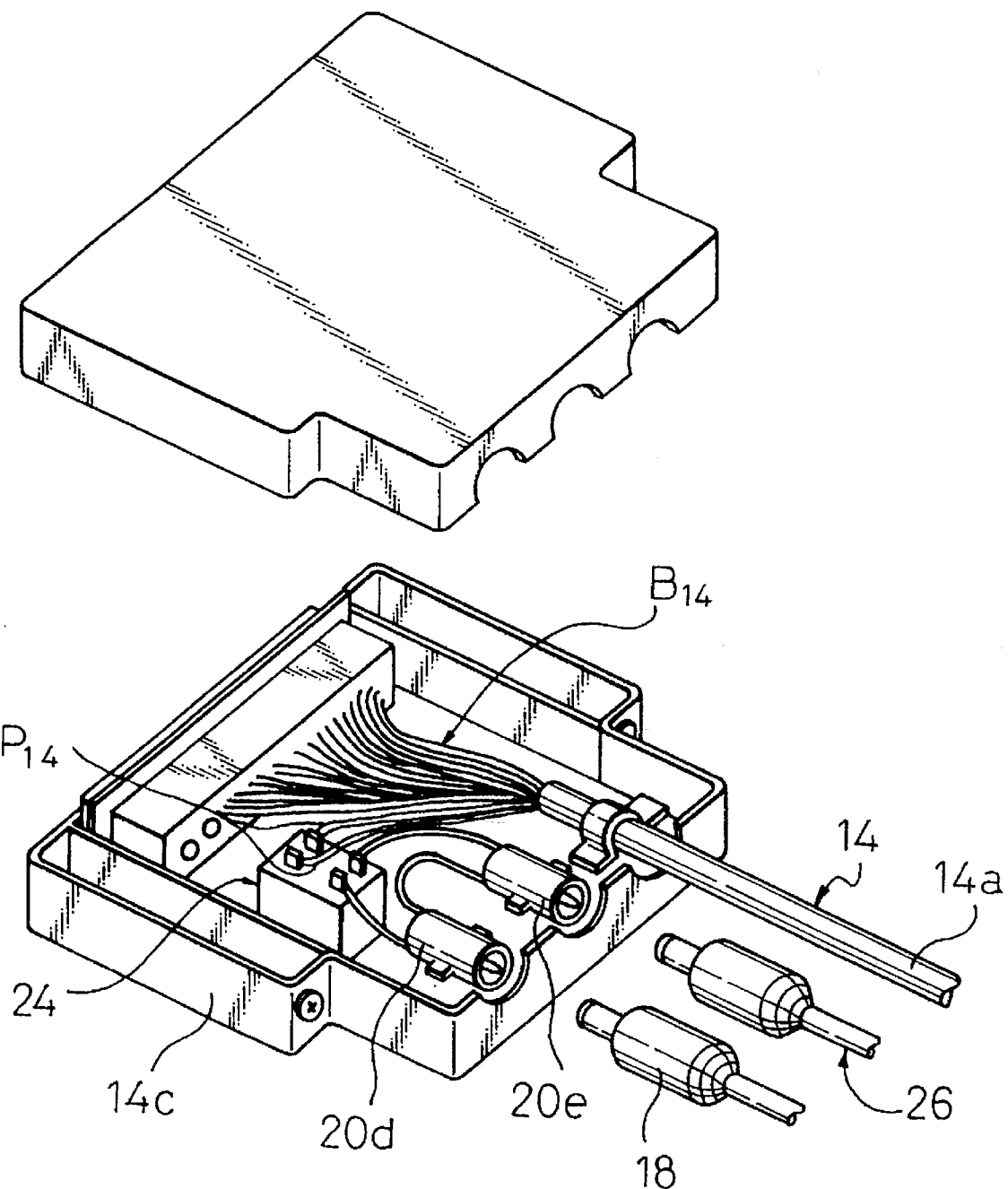
FIG. 4 is a perspective view showing still another embodiment of an external power source on/off control system of this invention which is incorporated in the other connector, i.e., the terminal apparatus side connector, of the interface cable.

FIG. 4, shows still another embodiment of an external power source on/off control system of this invention which is incorporated in the other connector 14b of the interface cable 14. The on/off control system in this embodiment is substantially the same as that of FIGS. 1 and 2. Therefore, the parts in FIG. 4 are indicated by the same or corresponding reference numerals as the block diagram in FIG. 1.

In particular, in the embodiment shown in FIG. 4, the connector 14c is provided therein with the connectors 20d and 20e which are connected to one other by means of the switch (24a) of the electromagnetic relay 24, in the same manner as FIG. 1. The connector 14c is also provided therein with the electromagnetic relay 24 as shown in FIG. 1, the coil (24b) thereof having respective end contacts connected to power supply lines $P_{14}$ extending from a cable body 14a of the interface cable 14.

When such an interface cable 14 is used for connecting the terminal apparatus 12' to the host apparatus 10, the power supply lines $P_{14}$ in the cable body 14a and the power supply lines $P_{10}$ are mutually connected by the connection between the connectors 14b (FIG. 1) and 10d. On the other hand, the connector 20d is connected to the connector 18 of the power supply line ($P_{16}$) extending from the external power source (16) and the connector 20e is connected to the connector 12b of the terminal apparatus 12' by means of the power supply cord 26. In the same manner as in the embodiment shown in FIGS. 1 and 2, when the power switch 10c (FIG. 1) of the host apparatus 10 is turned on, a power supply from the external power source 16 to the terminal apparatus 12' is started and, on the other hand, when the power switch 10c of the host apparatus 10 is turned off, the power supply from the external power source 16 to the terminal apparatus 12' is stopped.

Figure 5:
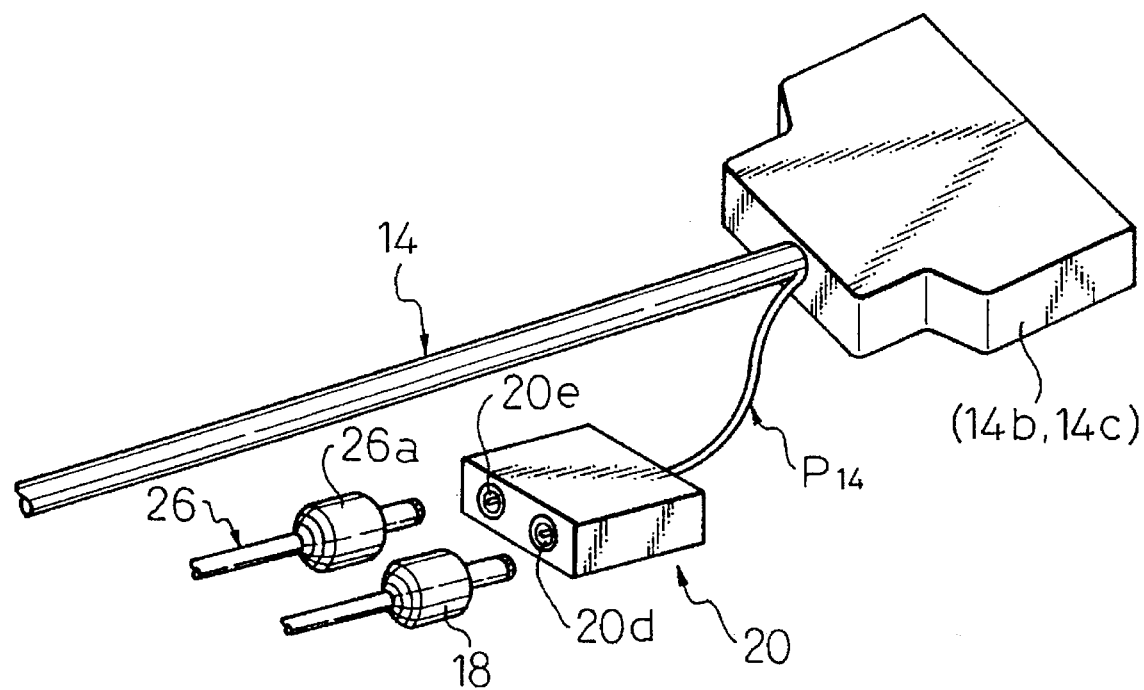
FIG. 5 is a perspective view showing a modification of the embodiment shown in FIG. 3.

FIG. 5 shows a modification of the embodiments shown in FIG. 3 or 4. In this modified embodiment, an external power source on/off control system of this invention is constituted as a unit 20 located outside of the connectors (14b, 14c), although, in the embodiments shown in FIGS. 3 and 4, the external power source on/off control system is incorporated in the connector (14b, 14c) of the interface cable 14. In this embodiment, any other type of relay, such as a photo-mos relay or the like, can also be used in place of the electromagnetic relay 24.

I claim:

1. An external power source on/off control system comprising:

a host apparatus having an internal power source and first switch means for turning on/off said internal power source;

at least one terminal apparatus;

an interface cable for electrically connecting said terminal apparatus to said host apparatus;

an external power source;

cable means for electrically connecting said external power source to said terminal apparatus to supply electrical power from said external power source to said terminal apparatus; and second switch means, incorporated in a module connected to said cable means, for detecting the on/off state of said internal power source to turn on/off said external power source on the basis of the on/off state of said internal power source.

2. A system as set forth in claim 1, wherein said second switch means comprises an electromagnetic relay.

3. A system as set forth in claim 1, wherein said second switch means comprises a photo-mos relay.

4. A system as set forth in claim 1, wherein said interface cable has the first and second ends thereof provided with first and second connectors connected to said host apparatus and said terminal apparatus, respectively, and said module containing said second switch means is also incorporated in one of said first and second connectors.

5. A system as set forth in claim 1, wherein said interface cable has first and second ends thereof provided with first and second connectors connected to said host apparatus and said terminal apparatus, respectively, and said module containing said second switch means is accommodated in a unit drawn from one of said first and second connectors.

6. An external power source on/off control system comprising:

a host apparatus having an internal power source and first switch means for turning on/off said internal power source;

at least one terminal apparatus;

a unit detachably connected to one of said host or terminal apparatuses;

an interface cable having first and second ends thereof provided with a first connector detachably connected to one of said host and terminal apparatuses via said unit and second connector detachably connected to the other of said host or terminal apparatuses;

an external power source;

cable means for electrically connecting said external power source to said terminal apparatus to supply electric power from said external power source to said terminal apparatus;

second switch means, incorporated in a module connected to said cable means, for detecting the on/off state of said internal power source to turn on/off said external power source on the basis of the on/off state of said internal power source; and said module containing said second switch means being accommodated in said unit.

7. A system as set forth in claim 6, wherein said second switch means comprises an electromagnetic relay.

8. A system as set forth in claim 6, wherein said second switch means comprises a photo-mos relay.

9. A connecting device including a housing comprising:

a first connector to which an external power supply source is to be connected;

a second connector to which a terminal apparatus is to be connected;

switch means provided in an electric line between said first and second connectors;

signal line connector means for electrically connecting a terminal apparatus to a host apparatus including an internal power source; and said switch means being turned on/off on the basis of the on/off state of said internal power source.

10. A connecting device as set forth in claim 9, wherein said signal line connector means comprising a first signal line connector to which said host apparatus is to be electrically connected and a second signal line connector to which said terminal apparatus is to be electrically connected.

11. A connecting device as set forth in claim 9, wherein said signal line connector means comprises a first signal line connector to which said host apparatus is to be electrically connected and a cable means having one end electrically connected to said first signal line connector and the other end to which said terminal apparatus is to be electrically connected.

12. A connecting device as set forth in claim 11, wherein said first signal line connector is provided at least a part thereof with contacts to which said internal power source is to be connected, and contacts are connected to said switch means so that said switch means is turned on/off on the basis of the on/off state of said internal power source.

13. A connecting device as set forth in claim 11, wherein said cable means is provided at least a part thereof with power line cables to which said internal power source is to be connected, and said power line cables are connected to said switch means so that said switch means is turned on/off on the basis of the on/off state of said internal power source.

14. A connecting device as set forth in claim 9, wherein said connector housing comprises a first connector housing accommodating said switch means and said signal line connector means and a second connector housing accommodating said first and second connectors.

15. A connecting device as set forth in claim 9, wherein said switch means is an electromagnetic relay.

* * * * *